Patented Aug. 12, 1941

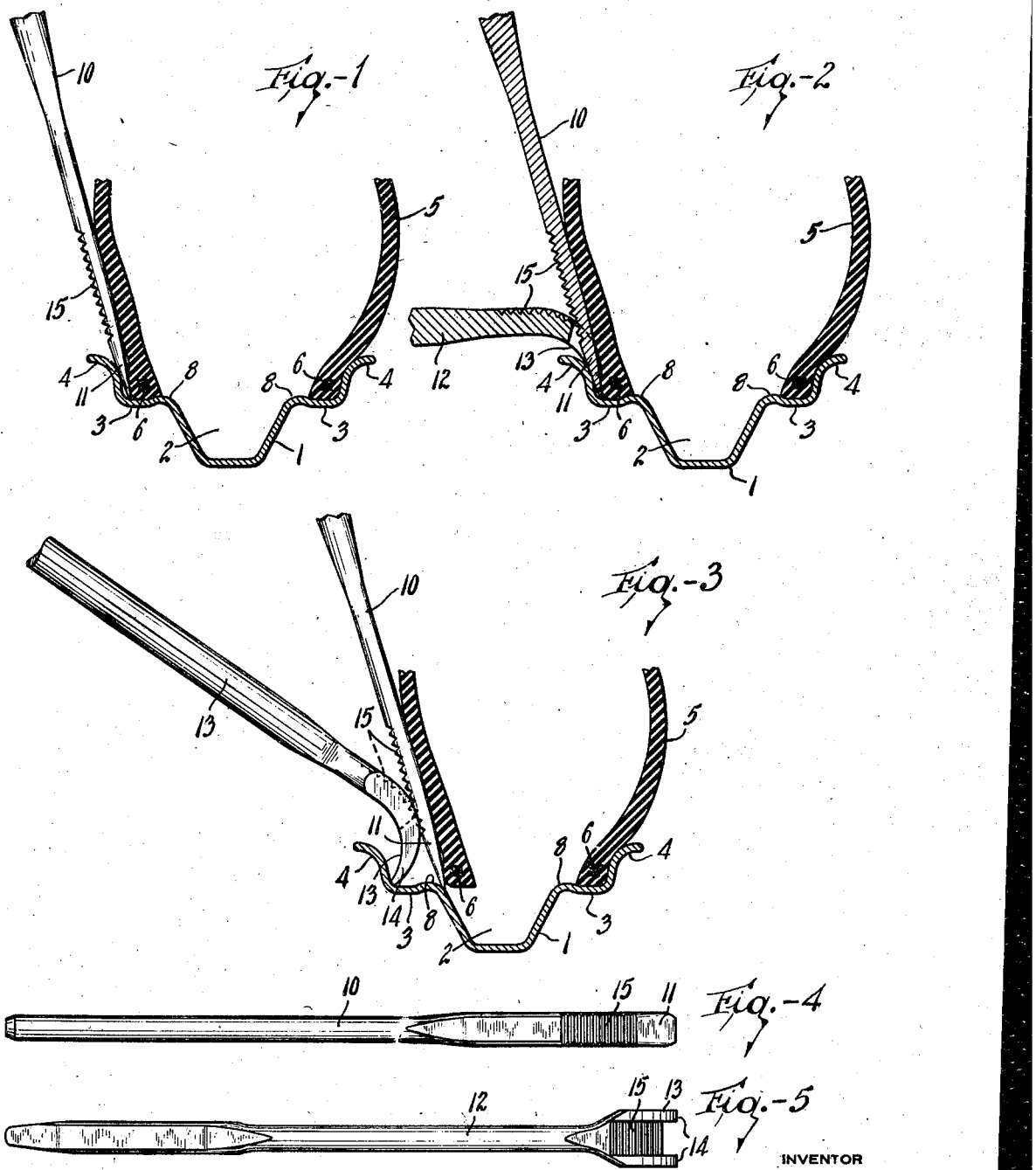

2,252,108

UNITED STATES PATENT OFFICE 2,252,108

TIRE TOOL

Raymond S. Worthington, Akron, Ohio, assignor to The Kennedy Service Tools Company, Mogadore, Ohio, a corporation of Ohio Application November 12, 1940, Serial No. 365,274

4 Claims. (Cl. 157—6)

The present invention relates to the manufacture of tools which are used for the removal of tire casings from rims and has been developed especially for the manipulation of tires on a type of rim which has recently developed considerable popularity. It will be understood, however, that the tool is not limited in its application to the particular type of rim shown and described herein, but that it may be used on all types of rims to great advantage.

It will also be understood that the best known and preferred embodiment of the invention is shown and described herein, but that changes and modifications may be made without departing from the invention or sacrificing any of its benefits.

In the drawing—

Fig. 1 is a cross-section of a drop-center rim of the particular form referred to, with a partial showing of the tire casing thereon and with one of the elements of the tool shown in place;

Fig. 2 is a similar cross-section showing both tools in place at the commencement of the tire removing operation;

Fig. 3 is a similar section showing the left hand tire bead freed from the rim and in position to move into the drop center preparatory to the removal of the tire;

Fig. 4 is a view showing the first element of the tool; and

Fig. 5 is a similar view showing the second element of the tool.

The rim, to which reference has been made, is indicated by the numeral 1, being formed of the usual drop center configuration in which there is a central well or depression 2 in which the beads of the tire are moved when demounting the tire. The rim is provided with the two tire seats 3 and the integral flanges 4. The tire is indicated at 5 and is provided with the usual wire bead reinforcement 6 which is characteristic of straight-side tires. The beads of the tire are practically inextensible, except with the exertion of very considerable force, more than can be applied with the ordinary tire tool.

Along the inner edge of each bead seat 3 is the raised rib 8 which is characteristic of the type of rim described, the purpose of which is to retain the tire casing in place after the tire is deflated so that the automobile operator may bring his car to a safe stop in the event of a blow-out or puncture.

The rib 8 offers an effective barrier to the movement of the tire bead into the well, and while tools have been designed to force the bead over the rib, those tools have been complicated and expensive and have not been sufficiently strong to withstand the heavy forces which are necessarily applied to move the inextensible bead over the rib.

The present tool is strong, simple and easily operated and gives to the operator a device which can be employed in an easy and effective manner.

The tool is composed of two parts, one of which may be termed the fulcrum member shown in Fig. 5 and the other the lever member shown in Fig. 4. The lever member is indicated by the numeral 10 and is a stout bar, the operative end 11 of which is flattened to provide a point of entrance between the bead of the tire and the flange 4. The fulcrum member is likewise a stout bar 12 having a rounded lower end 13 provided with the two prongs 14 which are spaced apart sufficiently to receive the end of the lever member 10. Along the face of the lever member and on the rounded surface of the fulcrum member are preferably formed teeth or serrations 15 which interlock as the tools are operated in conjunction.

In manipulating the tool, the lever member is first inserted between the tire bead and the flange, as shown in Fig. 1; the hooked end of the fulcrum member is then inserted between the tire bead and the flange, as shown in Fig. 2, the two prongs being located on either side of the lever and thus preventing it from slipping sidewise. The two tools are then brought together, as shown in Fig. 3, the tool 10 being forced over toward the center of the rim by rolling it along the curved surface of the fulcrum member which constitutes a rolling fulcrum which advances toward the tire as the free ends of the tools approach each other. The interengagement of the toothed portions of the tools prevents any tendency of the tool 10 to slip out of position as pressure is exerted, for if the surfaces were smooth, the resistance of the tire would tend to squeeze the tool outwardly rather than to cause the tire to be dislodged from its position behind the rib 8. It is possible to secure substantially the same results by roughening one tool only. It is also possible to secure fairly satisfactory operation by omitting all roughening of the contacting surfaces and secure some of the advantages of the tool design. When the tools are moved from the position shown in Fig. 2 to that of Fig. 3, the bead will be moved into the central depression of the rim. As the tire rim will often rust in service, the difficulty of dislodging the tire bead is increased over the resistance afforded by the bead.

It will be understood that the toothed formation shown and described may be replaced by any suitable form of roughening which will cause the tools to interlock sufficiently to prevent the sliding of one tool over the other. It will also be appreciated that the tool 10 may be forked and the end of the tool 12 fit between the forks.

The tool is also useful in the demounting of any tire, as the rusting of any tire to a rim increases the difficulties attendant upon tire changing. As shown, the outer end of the tool 12 may be flattened which will make it a useful tire iron in further manipulation of the tire.

What is claimed is:

1. A tire tool comprising a lever member having an operative end constructed and arranged to be inserted into the space between the bead of a tire and the flange of a rim, and a fulcrum member having a hooked end constructed and arranged to be inserted into the space between the bead of a tire and the flange of a rim, said lever having a substantially elongated flat outer portion adjacent said operative end, said fulcrum member having an inner convex surface on a comparatively wide arc in rolling engagement with said flat outer surface of said lever member as the angular relation of said members is changed, said rolling engagement acting to force said operative end of said lever and said hooked end of said fulcrum member apart to spread the bead away from the rim flange.

2. A tire tool as recited in claim 1 wherein one of said members is provided with means to prevent lateral slippage between the members.

3. A tire tool as recited in claim 1 wherein said hooked end of said fulcrum member is bifurcated to straddle the operative end of said lever to prevent lateral slippage between the members.

4. A tire tool as recited in claim 1 wherein mating teeth are formed on the engaging surfaces of said members to prevent slippage of said rolling engagement and to force the lower end of the lever member against the bead seat of said rim.

RAYMOND S. WORTHINGTON.